United States Patent
Wachter et al.

[11] Patent Number: 6,022,471
[45] Date of Patent: *Feb. 8, 2000

[54] MESOPOROUS FCC CATALYST FORMULATED WITH GIBBSITE AND RARE EARTH OXIDE

[75] Inventors: William A. Wachter; Vinh T. Nguyen, both of Baton Rouge, La.

[73] Assignee: Exxon Research and Engineering Company, Florham Park, N.J.

[*] Notice: This patent is subject to a terminal disclaimer.

[21] Appl. No.: 08/730,954

[22] Filed: Oct. 15, 1996

[51] Int. Cl.[7] .............................. C10G 11/05; B01J 29/06
[52] U.S. Cl. .............................. 208/120; 502/65; 502/64; 502/73; 502/263; 502/302; 502/304
[58] Field of Search ................... 502/64, 65, 67, 502/70, 73, 75, 87, 355, 263, 302, 304; 208/118, 119, 120

[56] References Cited

U.S. PATENT DOCUMENTS

| | | | |
|---|---|---|---|
| 4,010,116 | 3/1977 | Secor et al. | 252/455 Z |
| 4,086,187 | 4/1978 | Lim et al. | 252/455 Z |
| 4,755,283 | 7/1988 | Hashimoto et al. | 208/120 |
| 4,839,026 | 6/1989 | Brown et al. | 208/120 |
| 4,968,405 | 11/1990 | Wachter | 208/120 |
| 5,051,385 | 9/1991 | Wachter | 502/64 |
| 5,147,836 | 9/1992 | Cheng et al. | 502/64 |
| 5,221,648 | 6/1993 | Wachter | 502/68 |
| 5,290,744 | 3/1994 | Degnan et al. | 502/67 |
| 5,346,875 | 9/1994 | Wachter et al. | 502/233 |
| 5,559,067 | 9/1996 | Lerner et al. | 502/68 |

*Primary Examiner*—Bekir L. Yildirim
*Attorney, Agent, or Firm*—James H. Takemoto

[57] ABSTRACT

A FCC catalyst having improved coke selectivity and a FCC process for converting hydrocarbon feedstocks to lower boiling products. The catalyst comprises a crystalline aluminosilicate zeolite, gibbsite, rare earth metal compound and a silica matrix prepared from at least one of a silica sol made by an ion-exchange process and an acidic silica sol prepared by mixing sodium silicate, an acid and an aluminum salt of an acid.

18 Claims, 4 Drawing Sheets

MESOPOROUS FCC CATALYST FORMULATED WITH GIBBSITE AND RARE EARTH OXIDE

FIELD OF THE INVENTION

This invention relates to mesoporous catalytic cracking catalysts. More particularly, catalytic cracking catalysts formulated with gibbsite and rare earth oxides show improved coke selectivity.

BACKGROUND OF THE INVENTION

Fluid catalytic cracking (FCC) is a well-known method for converting high boiling hydrocarbon feedstocks to lower boiling, more valuable products. In the FCC process, the high boiling feedstock is contacted with a fluidized bed of catalyst particles in the substantial absence of hydrogen at elevated temperatures. The cracking reaction typically occurs in the riser portion of the catalytic cracking reactor. Cracked products are separated from catalyst by means of cyclones and coked catalyst particles are steam-stripped and sent to a regenerator where coke is burned off the catalyst. The regenerated catalyst is then recycled to contact more high boiling feed at the beginning of the riser.

Typical FCC catalysts contain active crystalline aluminosilicates such as zeolites and active inorganic oxide components such as clays of the kaolin type dispersed within an inorganic metal oxide matrix formed from amorphous gels or sols which bind the components together on drying. It is desirable that the matrix be active, attrition resistant, selective with regard to the production of hydrocarbons without excessive coke make and not readily deactivated by metals. Current FCC catalysts may contain in excess of 40 wt. % zeolites. At these high zeolite concentrations, it is difficult to maintain a pore structure that is highly mesoporous while at the same time highly active and selective.

U.S. Pat. No. 5,221,648 describes a FCC catalyst which is a composite of a crystalline aluminosilicate zeolite within a mesoporous silica-alumina matrix. The matrix has a polymodal pore size distribution and is attrition-resistant and selective in the production of olefins. U.S. Pat. No. 4,908,405 relates to a FCC process employing a catalyst composition comprised of a monodispersed mesoporous aluminosilicate matrix material having pore diameter between about 100 and 500 Angstroms, alumina and a crystalline zeolite. U.S. Pat. No. 4,010,116 is directed to zeolite catalysts having improved thermal stability. The catalysts incorporate a synthetic mica-montmorillonite aluminosilicate, in admixture with a pseudoboehmite, AlO(OH)—$H_2O$. The pseudoboehmite may contain crystalline aluminum trihydroxides, $Al(OH)_3$, such as bayerite and gibbsite. Upon calcination at 500° C., pseudoboehmite converts to gamma alumina. Therefore, a fresh catalyst containing pseudoboehmite would contain increasing amounts of gamma alumina as it ages in the FCC unit.

It would be desirable to use gibbsite in the inorganic matrix of a FCC catalyst because it is abundant and inexpensive. However, gibbsite is known to have a low surface area and is relatively inert in terms of its activity and has therefore been little used in FCC catalysts.

SUMMARY OF THE INVENTION

It has been discovered that a mesoporous FCC catalyst having improved coke selectivity can be formulated using gibbsite provided that the catalyst is further exchanged with rare earth metal. Accordingly the present invention relates to a catalytic cracking catalyst having improved selectivity for conversion over coke formation which comprises:

(a) from 1 to 80 wt. %, based on catalyst composition, of a crystalline aluminosilicate zeolite having a silica to alumina mole ratio of about 2.0 or greater;

(b) from 5 to 50 wt. %, based on catalyst composition, of gibbsite;

(c) from 0.5 to 20 wt. %, based on catalyst composition, of at least one rare earth metal compound; and (d) a silica matrix, wherein the silica matrix is prepared from at least one of (i) a silica sol made by an ion-exchange process, and/or (ii) an acidic silica sol prepared by mixing sodium silicate, an acid and, and an aluminum salt of a mineral acid provided that the sol is not converted to a gel during catalyst preparation.

Another embodiment of the invention relates to a fluid catalytic cracking process for converting a hydrocarbon feedstock into lower boiling products which comprises contacting the hydrocarbon feedstock with a fluidized bed of the catalytic cracking catalyst having improved selectivity for conversion over coke formation described catalytic cracking conditions.

DETAILED DESCRIPTION OF THE INVENTION

Figure 1:
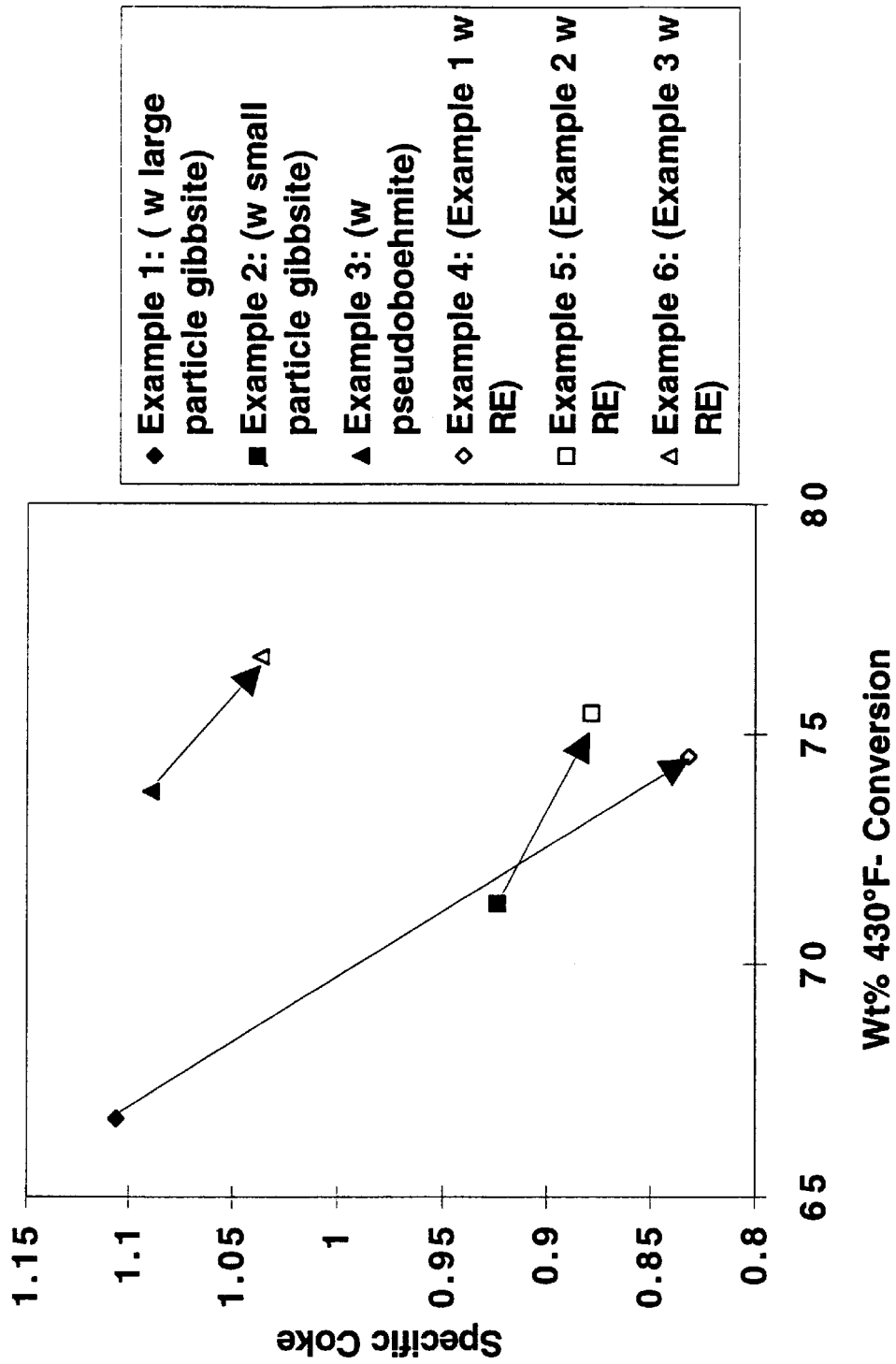
FIG. 1 shows specific coke as a function of conversion.

The FCC catalyst according to the invention is comprised of a matrix material having dispersed therein a crystalline aluminosilicate zeolite, gibbsite and a rare earth metal compound.

The matrix material is mesoporous having pore diameters in the range between about 100 to 300 Å and may contain two different types of silica sols, and preferably a clay component. A first type of silica sol is made by an ion-exchange process. Monodispersed silica sols are commercially available under trade names such as LUDOX (E. I. DuPont), NALCOLAG (Nalco Chemical Co.) and NYACOL (PQ Corporation). The second type of silica sol is prepared by reacting sodium silicate with a mineral acid followed by addition of an aluminum salt. The type of mineral acid is not critical, sulfuric acid is preferred. The aluminum salt is preferably the salt of a mineral acid, e.g., hydrated aluminum sulfate.

Virtually any crystalline aluminosilicate zeolite having catalytic cracking activity can be used in the practice of this invention. Such zeolite materials are described in U.S. Pat. Nos. 3,660,274 and 3,944,482, both of which are incorporated herein by reference. Non-limiting examples of such zeolites which can be employed in the practice of this invention, include both natural and synthetic zeolites. These zeolites include zeolites of the structural types included in the "Atlas of Zeolite Structural Types" edited by W. M. Meier and D. H. Olson and published by the Structure Commission of the International Zeolite Association in 1987 and also included herein by reference. Preferred are the faujasites, more preferred are zeolites X and Y, which are faujasite-type zeolites, and most preferred is zeolite Y. The term faujasite-type, as used therein, means those zeolites isostructural to faujasite.

Zeolites typically have silica-to-alumina mole ratios ($SiO_2/Al_2O_3$) of at least about 2 and uniform pore diameters from about 4 to 15 Angstroms. Zeolites as produced or found in nature normally contain an alkali metal cation, such as sodium and/or potassium and/or an alkaline earth metal cation, such as magnesium and/or calcium. When used as a hydrocarbon cracking catalyst component, it is usually necessary to decrease the alkali metal content of the crystalline zeolite to less than about 5 wt. %, preferably less than about 1 wt. %, and more preferably less than about 0.5 wt. %. The alkali metal content reduction, as is known in the art, may be conducted by exchange with one or more cations selected from the Groups IIB through VIII of the Periodic Table of Elements (the Periodic Table of Elements referred to herein is given in *Handbook of Chemistry and Physics*, published by the Chemical Rubber Publishing Company, Cleveland, Ohio, 45th Edition, 1664), as well as with hydrogen cations or hydrogen precursors, e.g., $NH_4+$, capable of conversion to a hydrogen cation. Preferred cations include rare earths, calcium, magnesium, hydrogen and mixtures thereof. Ion-exchange methods are well known in the art and are described, for example, in U.S. Pat. No. 3,140,249; U.S. Pat. No. 3,142,251 and U.S. Pat. No. 1,423,353, the teachings of which are hereby incorporated by reference. The concentration of the hydrogen cation in the finished catalyst is the difference between the theoretical exchange capacity of the particular zeolite and the number of equivalents of rare earths, alkaline earths, and alkali metals actually present. The particle size of the zeolite component may range from about 0.1 to 10 microns, preferably from about 0.5 to 3 microns. The amounts of zeolite component in the total catalyst will generally range from about 1 percent to about 80 percent, preferably from about 5 percent to about 70 percent, more preferably from about 10 percent to about 60 percent based on the total weight of catalyst. The silica: alumina weight ratio of the catalyst ranges from about 4:1 to about 1:4, preferably from about 2:1 to about 1:2.

Gibbsite has the chemical formula $Al(OH)_3$ and is the principal constituent of bauxites. Gibbsite has a monoclinic crystal symmetry with four molecules per unit cell. It is commercially available from Alcoa in particles sizes ranging from 0.3 to 2.0 microns under the tradename SPACERITE. The amount of gibbsite is preferably from 10 to 40 wt. %, based on catalyst composition.

In a first step of the catalyst preparation procedure, zeolite, gibbsite and preferably one or more clays and zeolite are added together or in sequence, in any order, and slurried at ambient temperature in a limited, controlled, and critical amount of water. In general, it has been found that the weight ratio of water: solids in the slurry can range between about 1.5:1 to about 4:1, preferably between about 1.7:1 to about 2:1. A weight ratio of water:solids approximating about 1.7 has been found highly successful in forming high quality catalysts. When the weight ratio of water:solids is less than about 1.4, the viscosity of the slurry is too high to spray dry, and when the weight ratio of water: solids exceeds about 4:1 the attrition-resistance of the catalyst is poor. The clay component added to, or slurried with the zeolite is typically a naturally occurring, relatively non- porous clay such as kaolin, bentonite, hectorite, sepiolite, attapulgite, montrnorillonite, halloysite or the like. The pH of the slurry at this time ranges between about 4 and about 10; and the addition of the clay to the slurry does not significantly alter the pH of the slurry, if at all.

In a second step, a silica sol obtained or derived from an ion-exchange process is added to the previously prepared zeolite, or zeolite/clay(s) slurry. The silica sol is one of controlled particle size; the particles of silica ranging from about 4.0 nm (nanometers) to about 22.0 nm, preferably from about 10.0 nm to about 15.0 nm average diameter. (*The Chemistry of Silica: Solubility, Polymerization, Colloid And Surface Properties, And Biochemistry* by Ralph K. Iler, John Wiley and Sons, 1979.) Thus, a monodispersed colloidal silica, or silica of controlled particle size, derived from an ion-exchange process, e.g. LUDOX, is added to the zeolite/clay(s) slurry, if necessary with enough additional water to maintain the water: solids weight ratio between about 1.5:1 and 4:1, preferably about 1.7:1 to 2:1, and the mixture thoroughly stirred to abrade and eliminate crumbs. Suitably, the slurry is admixed and abraded on a colloid mill to produce particles ranging in size from about 1–3 microns. The pH of the slurry at this time is about neutral, or ranges generally between about 4 and 10.

Silica sols suitable for use in the present invention are any of those derived from an ion-exchange process which have a substantially uniform particle size within the range of about 20 to 400 Angstroms. The term, substantially uniform, as used herein with respect to the particle size means that at least 80%, preferably at least 90%, of the particles have a particle size from about 0.5D to 1.5D, where D is the median particle diameter. It is preferred that the silica sols used herein have spheroid particle shapes. These silica sols can be prepared by any conventional method in the art and examples can be found in *The Chemistry of Silica: Solubility, Polymerization, Colloid and Surface Properties, and Biochemistry* by Ralph K. Iler, John Wiley and Sons, New York, 1979.

An aluminum salt, e.g. aluminum sulfate, can be added to the admixture subsequently to the silica sol derived from the ion-exchange process.

In the next, or third step, a second type of silica sol prepared by the reaction of a sodium silicate solution and a solution of a mineral acid and the salt of a mineral acid, as e.g. a solution of sulfuric acid and aluminum sulfate, with an aluminum salt, unless the aluminum salt has been previously added, is blended with the zeolite/clay(s)/silica sol slurry, additionally adding water if necessary to maintain the water-:solids ratio between about 1.5:1 to 4:1, preferably about 1.7:1 to 2:1. A sufficient amount of the acid silica sol is added to adjust the pH within a range of from about 2 to 5, preferably from about 2.5 to about 4.5. The density of the slurry, on completing the addition of the acid silica sol, preferably ranges from about 1.16 to about 1.25, and more preferably from about 1.18 to about 1.22.

After blending the acid silica sol, and aluminum salt, with the zeolite/clay(s)/silica sol slurry, with adjustment of the water content, density, and preferably also the viscosity, the slurry, now containing all essential components, is now ready for feeding to a spray drier to form spherical particles.

In a fourth step, the slurry suitably at/or below ambient temperature is fed to a drier, preferably a spray drier, at a temperature sufficient to remove the water and form microspheres of average particle diameter ranging from about 10 microns to about 200 microns, preferably from about 60 microns to about 100 microns. The temperature is sufficiently high to dry the slurry and form a rigid structure, but insufficiently high as to cause alkali metal components to be occluded within the zeolite and prevent it from being washed, ion-exchanged, and removed from the zeolite. Typically, the slurry is fed to a drier, preferably a spray drier at an average inlet temperature ranging from about 250° C. to about 350° C., and an outlet temperature ranging from about 125° C. to about 225° C. Surprisingly, the mesoporosity of the matrix material, and mechanical strength of the catalyst, is dependent on the amount of water contained in the slurry. It is essential that the water:solids content of the slurry range between about 1.5:1 to about 4:1, preferably from about 1.7:1 to about 2:1, and the density of the slurry be greater than 1.16 g/cc, and preferably greater than 1.18 g/cc to form catalysts of this invention.

In a fifth step, the particles of microspherical shape are washed with deionized water at temperatures such as about 50° C., and ion-exchanged by contact with an ammonium salt solution of a strong acid for a time sufficient to remove the alkali metal, e.g. sodium, from the zeolite. Exemplary of ammonium salts which can be used in solution for this purpose are ammonium sulfate, ammonium chloride, ammonium nitrate and the like. The ion-exchanged particles are generally again washed, e.g. at about 50° C. Typically, the zeolite portion of the catalyst, after ion-exchange, and washing, contains less than about 1.0 percent alkali metal, and generally less than about 0.5 percent of the alkali metal. The non-zeolitic portion of the pre-catalyst, or matrix, prior to steaming, contains pores of bimodal distribution; a distribution which after steaming is shifted to pore distributions, as measured by mercury porosimetry, wherein at least 75 percent, and preferably from about 80 percent to about 90 percent, of the pore volume between 45 Angstroms and 2000 Angstroms is in pores of diameter greater than 160 Angstroms. Generally, and preferably, after steaming, the pore distribution of the matrix material is polymodal wherein, of the pore volume measured between 45 Angstroms and 2000 Angstroms, a first mode of which is characterized as having at least about 75 percent, and preferably from about 80 percent to about 90 percent, pore sizes greater than 160 Angstroms in diameter, and a second mode wherein up to 20 percent, and preferably from about 5 percent to about 10 percent, of the pore sizes are greater than 100 Angstroms in diameter, but less than 160 Angstroms in diameter. In its most preferred aspects the matrix material, after steaming, is bimodal and is characterized as having a first mode wherein at least about 75 percent, preferably from about 80 percent to about 90 percent, of the pore volume between 45 Angstroms and 2000 Angstroms is in pores greater than 160 Angstroms diameter, and more particularly the pores are of diameter ranging between about 160 Angstroms and 400 Angstroms diameter, more particularly between about 200 Angstroms and 250 Angstroms diameter, and a second mode wherein up to about 20 percent, and preferably up to about 10 percent of the pores are of diameter exceeding 100 Angstroms diameter. Generally, and preferably at least about 5 percent, more preferably from about 5 percent to about 10 percent, of the pores are of a size distribution ranging between about 100 Angstroms and 160 Angstroms, preferably between about 110 Angstroms and 150 Angstroms. These measurements are taken after steaming the particles at 760° C. in 1 atmosphere of steam for a period of sixteen hours.

In a final step, the catalyst composition is slurried with deionized water containing a rare earth metal salt. Rare earth metal salts are mineral acid salts derived from Group IIIB of the Periodic table (Handbook of Chemistry and Physics) and are also known as the lanthanide series. Rare earths include the series from lanthanum (atomic no. 57) through lutetium (atomic no. 71). Preferred rare earth salts include salts of lanthanum, neodymium, praeseodymium and cerium. The slurry is heated to temperature of about 30 to 80° C. and the pH adjusted in the range 4 to 10 using a strong base such as ammonium hydroxide. After stirring, the pH is adjusted in the range 7 to 9 by adding addition of base. The resulting mixture was filtered, washed with deionized water and calcined at temperature of from 450 to 650° C. After calcining, the catalyst may be steamed. Calcining converts almost all to the rare earth salts into their corresponding oxide form. The amount of rare earth compound in the finished catalyst composition is preferably from 0.5 to 15 wt. %, especially from 0.75 to 10 wt. %, based on catalyst composition.

In conducting the catalytic cracking operation, utilizing the catalyst of this invention, the temperature employed ranges from about 750° F. (399° C.) to about 1300° F. (1704° C.), preferably from about 900° F. (482° C.) to about 1050° F. (566° C.), and the pressure employed is one ranging from about 0 psig (101 kPa) to about 150 psig (1136 kPa, preferably from about 0 psig (101 kPa) to about 45 psig (411 kPa). Suitably, catalyst/oil ratios in the cracking zone used to convert the feed to lower boiling products are not more than about 30:1, and may range from about 20:1 to about 2:1, preferably from about 4:1 to about 9:1. The catalytic cracking process may be carried out in a fixed bed, moving bed, ebullated bed, slurry, transfer line (dispersed phase) or fluidized bed operation. Suitable regeneration temperatures include a temperature ranging from about 1100 to about 1500° F. (593 to about 816° C.), and a pressure ranging from about 0 to about 150 psig (101 to about 1136 kPa). The oxidizing agent used to contact the partially deactivated (i.e., coked) catalyst will generally be an oxygen-containing gas such as air, oxygen and mixtures thereof. The partially deactivated (coked) catalyst is contacted with the oxidizing agent for a time sufficient to remove, by combustion, at least a portion of the carbonaceous deposit and thereby regenerate the catalyst in a conventional manner known in the art.

Suitable hydrocarbonaceous feeds for the catalytic cracking process of the present invention include naphtha, hydrocarbonaceous oils boiling in the range of about 430° F. to about 1050° F., such as gas oil; heavy hydrocarbonaceous oils comprising materials boiling above 1050° F.; heavy and reduced petroleum crude oil; petroleum atmospheric distillation bottoms; petroleum vacuum distillation bottoms; pitch, asphalt, bitumen, other heavy hydrocarbon residues; tar sand oils; shale oil; liquid products derived from coal liquefaction processes, and mixtures thereof.

The invention is further illustrated by the following non-limiting examples which also illustrate a preferred embodiment of the invention.

EXAMPLE 1

This Example is directed to a catalyst composition containing zeolite, large particle gibbsite and kaolin in a mesoporous matrix.

7.50 lb. (0.800 solids) (3.4 kg) of ultrastable Y zeolite, 4.5 lb. (2.0 kg) of large particle gibbsite (Al(OH)$_3$) having a particle size 1.0–2.0 $\mu$(Alcoa) and 3.0 lb. (1.4 kg) of Hydrite UF clay (Georgia Kaolin) were mixed together dry and then dispersed in a solution of 12.0 lb. (5.45 kg) of water and 8.0 lb. (3.6 kg) of LUDOX HS-40 monodispersed silica sol (E. I. DuPont). This mixture was colloid milled and set aside. The pH of the mixture was 5.8.

21.2 lb. (9.62 kg) of "N"-brand sodium silicate (PQ Corp.) was added to 28.8 lb. (13.1 kg) of water. 32.8 lb. (14.9 kg) of this solution was placed in the "on-balance" tank and the remaining solution was placed in the "off-balance" tank. To 28.1 lb. (12.8 kg) of water was added 5.00 lb. (2.27 kg) of concentrated sulfuric acid and 7.09 lb. (3.22 kg) of aluminum sulfatepentadecahydrate. The acid alum was pumped to a slop tank and then the sodium silicate solution was turned on. When the pH of the emerging stream rose to 3.0, the rate of the silicate solution was maintained. The silica sol stream was diverted to an on-balance drum and fed by the "on-balance" sodium silicate tank. When no more sodium silicate solution remained in the "on-balance" tank, the emerging stream was switched to the drain. This sol was immediately placed in a pump-around. Then 5.22 lb. (2.37 kg) of aluminum sulfatepentadecahydrate dissolved in 10.0 lb. (4.54 kg) of $H_2O$ was added to the pump-around. Finally the zeolite/clay/aluminum hydroxide/LUDOX slurry was added to the pump-around. The pH of the catalyst slurry was 3.2 and density of the catalyst slurry was 1.23 g/cc.

The catalyst was spray dried at the following conditions: 550° F. (288° C.) inlet temperature, 350° F. (177° C.) outlet temperature, and 15,000 rpm. Spray drying was completed in 1 hour 55 minutes. 10.5 lb. (4.77 kg) of product was recovered from the drier and 10.5 lb. (4.77 kg) was recovered from the cyclone. 4000 g of deionized water was pumped over each of two batches of 250 g of the dried catalyst using a fluidized bed ion-exchanger operating between 90 and 75° C. 4000 g of 12% ammonium sulfate solution was pumped over each catalyst at 74–90° C. in the fluidized bed ion exchanger followed by 8000 g of deionized water. The catalysts were calcined at 550° C. for 2 hours to give 70 g of Example 1.1A and 71 g of Example 1.2A. The overflows from Examples 1.1A and 1.2A were combined, and ion-exchanged and combined to give 108 g of Example 1.3A. Examples 1.1A, 1.2A and 1.3A were steamed at 1400° F. (760° C.) for 16 hr. to give Examples 1.1B, 1.2B and 1.3B.

The remaining solids were charged to the large fluidized bed ion exchanger and washed with ca. 100 lb. (45.4 kg) of distilled water, exchanged with 110 lb. (49.9 kg) of 5% $(NH_4)_2SO_4$ solution at 76° C. for 2 hours, and then washed with 100 lb. 45.4 kg) of distilled water at 76° C. for another 2 hours. The catalyst was then dried and calcined at 538° C. for 4 hours to give Example 1.4A. This catalyst was steamed 760° C. for 16 hours to Example 1.4B.

EXAMPLE 2

This Example is directed to a catalyst composition containing zeolite, small particle gibbsite and kaolin in a mesoporous matrix.

7.50 lb. (0.800 solids) (3.40 kg) of ultrastable Y zeolite, 4.6 lb. (2.1 kg) of small particle gibbsite having a particle size 0.3–0.85 μ (65.4% solids) (Alcoa), and 3.0 lb. (1.4 kg) of Hydrite UF clay (Georgia Kaolin) were mixed together dry and then dispersed in a solution of 12.0 lb. (5.45 kg) of water and 8.0 lb. (3.6 kg) of LUDOX HS-40 monodispersed silica sol (DuPont). The mixture was colloid milled and set aside. The pH of the zeolite/clay/sol slurry was 5.9.

To 28.8 lb. (13.1 kg) of water, was added 21.2 lb. (9.62 kg) of "N"-brand sodium silicate (PQ Corp.). 32.8 lb. (14.9 kg) of this solution was placed in the "on-balance" tank and the remaining solution was placed in the "off-balance" tank. To 28.1 lb. (12.8 kg) of water was added 5.00 lb. (2.27 kg) of concentrated sulfuric acid and 3217 g (7.09 lb.) of aluminum sulfatepentadecahydrate. The acid alum was pumped to a slop tank and then the sodium silicate solution was turned on. When the pH of the emerging stream rose to 3.0, the rate of the silicate solution was maintained. The silica sol stream was diverted to an on-balance drum and fed by the "on-balance" sodium silicate tank. When no more sodium silicate solution remained in the "on-balance" tank, the emerging stream was switched to the drain. This sol was immediately placed in a pump-around. Then 5.22 lb. (2.37 kg) of aluminum sulfatepentadecahydrate dissolved in 10.0 lb. (4.54 kg) of $H_2O$ was added to the pump-around. Finally, the zeolite/clay/aluminum hydroxide/LUDOX slurry was added to the pump-around. The pH of the catalyst slurry was 3.1 and the slurry density was 1.23 g/cc.

The catalyst was spray dried at the following conditions: 550° F. (288° C.) inlet temperature, 350° F. (177° C.) outlet temperature, and 15,000 rpm. Spray drying was completed in 2 hours. 10.0 lb. (4.54 kg) of product was recovered from the drier and 4.6 lb. (2.1 kg) was recovered from the cyclone. 4000 g of deionized water was pumped over each of two batches of 250 g of the dried catalyst followed by 4000 g of 12% ammonium sulfate solution and 8000 g of deionized water at 74–90° C. in the fluidized bed ion exchanger. The catalysts were calcined at 550° C. for 2 hours to give 132 g of Example 2.1A and 131 g of Example 2.1A. Examples 2.1A and 2.2A were steamed at 760° C. for 16 hours to give Examples 2.1B and 2.2B.

The remaining solids were charged to the large fluidized bed ion exchanger and washed with ca. 100 lb. (45.4 kg) of distilled water, exchanged with 110 lb. (49.9 kg) of 5% $(NH_4)_2SO_4$ solution at 76° C. for 2 hours, and then washed with 100 lb. (45.4 kg) of distilled water at 76° C. for another 2 hours. The catalyst was then dried and calcined at 538° C. for 4 hours to give Example 2.3A. This catalyst was steamed at 760° C. for 16 hours to give Example 2.3B.

EXAMPLE 3

This Example is directed to a catalyst composition containing zeolite, pseudoboehmite and kaolin in a mesoporous matrix.

7.50 lb. (0.800 solids) (3.4 kg) of ultrastable Y zeolite, 4.3 lb. (1.95 kg) of large particle pseudoboehmite alumina (Davison), and 3.0 lb. (1.4 kg) of Hydrite UF clay (Georgia Kaolin) were mixed together dry and then dispersed in a solution of 12.0 lb. (5.45 kg) of water and 8.0 lb. (3.6 kg) of LUDOX HS-40 monodispersed silica sol (DuPont). The mixture was colloid milled and set aside. The pH of the zeolite/clay/sol slurry was 5.8.

To 28.8 lb. (13.1 kg) of water, was added 21.2 lb. (9.62 kg) of "N"-brand sodium silicate (PQ Corp.). 32.8 lb. (14.9 kg) of this solution was placed in the "on-balance" tank and the remaining solution was placed in the "off-balance" tank. To 28.1 lb. (12.8 kg) of water was added 5.00 lb. (2.27 kg) of concentrated sulfuric acid and 3217 g (7.09 lb.) of aluminum sulfatepentadecahydrate. The acid alum was pumped to a slop tank and then the sodium silicate solution was turned on. When the pH of the emerging stream rose to 3.0, the rate of the silicate solution was maintained. The silica sol stream was diverted to an on-balance drum and fed by the "on-balance" sodium silicate tank. When no more sodium silicate solution remained in the "on-balance" tank, the emerging stream was switched to the drain. This sol was immediately placed in a pump-around. Then 5.22 lb. (2.37 kg) of aluminum sulfatepentadecahydrate dissolved in 10.0 lb. (4.54 kg) of H$_2$O was added to the pump-around. Finally, the zeolite/clay/aluminum hydroxide/LUDOX slurry was added to the pump-around. The pH of the catalyst slurry was 3.3, and the slurry density was 1.22 g/cc.

The catalyst was spray dried at the following conditions: 550° F. (288° C) inlet temperature, 350° F. (177° C.) outlet temperature and 15,000 rpm. 10.7 lb. (4.86 kg) of product was recovered from the drier and 4.6 lb. (2.1 kg) was recovered from the cyclone. 4000 g of deionized water was pumped over each of two batches of 250 g of the dried catalyst using the fluidized bed ion exchanger followed by 4000 g of 12% ammonium sulfate solution and 8000 g of deionized water at 74–90° C. The catalysts were calcined at 550° C. for 2 hours to give 138 g of Example 3.1A and 137 g of Example 3.2A. Examples 3.1A and 3.2A were steamed at 760° C. for 16 hours to give Examples 3.1B and 3.2B.

The remaining solids were charged to the large fluidized bed ion exchanger and washed with ca. 100 lb. (45.4 kg) of distilled water, exchanged with 130 lb. (59.0 kg) of 5% (NH$_4$)$_2$SO$_4$) solution at 76° C. for 2 hours, and then washed with 100 lb. (45.4 kg) distilled water at 76° C. for another 2 hours. The catalyst was then dried and calcined at 538° C. for 4 hours to give Example 3.3A. This catalyst was steamed at 760° C. for 16 hours to give Example 3.3B.

EXAMPLE 4

The catalyst composition of Example 1, designated Example 1.4A, and formulated with large particle gibbsite was ion-exchanged with rare earth metal salt to form a catalyst according to the invention.

1004 g of Example 1.4A (29% Al$_2$O$_3$/69.7% SiO$_2$/0.125% Na), 42.6 g of La (NO$_3$)$_3$●5H$_2$O, and 2.0 lb. (0.91 kg) of deionized water were heated to 55° C. with stirring to get a pH of 2.0. 15.8 g of 29% NH$_3$ (aqueous concentrated ammonium hydroxide) was added to raise the pH to 3.8. This was stirred 16 hours, then the temperature was raised to 95° C. and the pH was raised from 2.6 to 4.6 by the addition of an additional 14.6 g of concentrated ammonium hydroxide. This was stirred an additional two (2) hours, filtered, washed 5×2000 g of deionized water, dried and calcined at 500° C. 2 hours to give Example 4.1A (1.41% lanthanum oxide). Example 4.1A was steamed in separate batches at 760° C. for 16 hours to give Examples 4.1B. and Examples 4.2B The properties of these catalysts are given in Table 1 following Example 6.

EXAMPLE 5

The catalyst composition of Example 2 designated Example 2.3A and formulated with small particle gibbsite was ion-exchanged with rare earth metal salt to form a catalyst according to the invention.

1004 g of Example 2.3A (28.7% Al$_2$O$_3$/70.9% SiO$_2$/0.141% Na), 42.6 g of La (NO$_3$)$_3$●5H$_2$O, and 2.0 l of deionized water were heated to 95° C. with stirring to get a pH of 1.6. 34.3 g of 29% NH$_3$ (aqueous) (concentrated ammonium hydroxide) was added to raise the pH to 4.5. This was stirred 1 hour, and the pH dropped to 3.8. An additional 1.9 g of concentrated ammonium hydroxide raised the pH to 4.3. This was stirred an additional 0.5 hour, filtered, washed 5×2000 g of deionized water, dried and calcined at 500° C. 2 hours to give Example 5.1A (1.52/ 1.56% lanthanum oxide). Example 5.1A was steamed in separate batches at 760° C. for 16 hours to give Example 5.1B and Example 5.2B. The properties of these catalysts are given in Table 1 following Example 6.

EXAMPLE 6

The catalyst composition of Example 3 designated Example 3.3A and formulated with large particle pseudoboehmite was ion-exchanged with rare earth metal salt to form a comparative catalyst.

1004 g of Example 3.3A (29.3% Al$_2$O$_3$/69.4% SiO$_2$/0.091% Na), 42.6 g of La (NO3)3●5H2O, and 2.5 l of deionized water were heated to 95° C. with stirring to get a pH of 1.4. 38.2 g of 29% NH3 (aqueous) (concentrated ammonium hydroxide) was added to raise the pH to 4.5. This was stirred 1 hour, and the pH dropped to 3.6. An additional 7.2 g of concentrated ammonium hydroxide raised the pH to 4.4. This was stirred an additional 0.5 hours, filtered, washed 5×2000 g of deionized water, dried and calcined at 500° C. 2 hours to give Example 6.1A (1.36% lanthanum oxide). Example 6.1A was steamed in separate batches at 760° C. for 16 hours to give Example 6.1B and Example 6.2B. These catalyst properties are given in Table 1.

TABLE 1

| CATALYST NO. | REO (1) wt % | SA,m2/ g(2) | PV,cc/ g(3) | Ucell, Å(4) | % Xtal (5) | Median Catalyst Particle Size μ |
|---|---|---|---|---|---|---|
| Example 4.1B | 1.41 | 154 | 0.209 | 24.31 | 17 | 50.6 |
| Example 4.2B | — | 159 | 0.193 | 24.32 | 18 | 51.9 |
| Example 5.1B | 1.56 | 203 | 0.245 | 24.33 | 23 | 52.9 |
| Example 5.2B | 1.52 | 189 | 0.227 | 24.33 | 20 | 52.2 |
| Example 6.1B | — | 216 | 0.286 | 24.31 | 22 | 54.7 |
| Example 6.2B | 1.36 | 205 | 0.28 | 24.33 | 18 | 53.9 |

(1) Rare earth oxide
(2) Surface area
(3) Pore volume
(4) Unit cell
(5) Relative percent crystallinity

EXAMPLE 7

The catalytic performance of the catalysts according to the invention (Examples 4 and 5) were compared with catalysts containing rare earth exchanged pseudoboehmite (Example 6) and catalysts which are not rare earth exchanged (Examples 1 to 3). A gas oil (PGO) having a boiling point in the 393 to 532° C. range (5%/95%) and 22.5 API was used in all tests. The evaluation test is a modified microactivity test (MAT). In this test, 2 cc of feed is injected over 5 gm of catalysts at a temperature of 482° C. over a period of 80 seconds. The conversion of feed to products which boil less than 220° C. is determined together with the coke and hydrogen yields. In order to allow a comparison between catalysts which produce different conversions, the coke yield and hydrogen yield are divided by a conversion function [x/(1−x)] in which x is the conversion from the 220° C.-fbp of the feed. The "normalized" coke and hydrogen yields are called the "specific coke" and the "specific hydrogen" respectively and allow comparison between catalysts of somewhat different activities. The results are summarized in Table 2.

TABLE 2

| ERDL Catalyst No. | MAT | Spec. Coke | MAT Avg. | Spec. Coke Avg. | MAT Std. Dev. | Spec. Coke Std. Dev. | Spec. H2 | C, wt % | H2, wt % |
|---|---|---|---|---|---|---|---|---|---|
| Ex. 1.4B | 65.3 | 1.12 | | | | | 0.032 | 2.1 | 0.0608 |
| Ex. 1.4B | 67.1 | 1.04 | | | | | 0.033 | 2.216 | 0.0679 |
| Ex. 1.4B | 66.5 | 1.02 | | | | | 0.033 | 2.029 | 0.0661 |
| Ex. 1.3B | 66.1 | 1.08 | | | | | 0.024 | 2.099 | 0.0459 |
| Ex. 1.3B | 67.5 | 0.92 | | | | | 0.025 | 1.906 | 0.051 |
| Ex. 1.3B | 67.4 | 0.94 | 66.65 | 1.02 | 0.86 | 0.078 | 0.026 | 1.937 | 0.0536 |
| Ex. 2.1B | 70.6 | 0.99 | | | | | 0.014 | 2.366 | 0.0348 |
| Ex. 2.1B | 68.3 | 1.02 | | | | | 0.018 | 2.189 | 0.0381 |
| Ex. 2.1B | 71.8 | 0.88 | | | | | 0.016 | 2.23 | 0.0395 |
| Ex. 2.2B | 70.4 | 0.84 | | | | | 0.016 | 2.003 | 0.0381 |
| Ex. 2.2B | 73 | 0.75 | | | | | 0.017 | 2.035 | 0.0456 |
| Ex. 2.2B | 71.7 | 0.88 | | | | | 0.016 | 2.220 | 0.0405 |
| Ex. 2.3B | 71.6 | 1.08 | | | | | 0.023 | 2.733 | 0.057 |
| Ex. 2.3B | 73.2 | 0.95 | | | | | 0.024 | 2.591 | 0.0657 |
| Ex. 2.3B | 74.9 | 0.92 | | | | | 0.021 | 2.745 | 0.0614 |
| Ex. 2.3B | 69.6 | 1.04 | | | | | 0.007 | 2.388 | 0.0168 |
| Ex. 2.3B | 73.7 | 0.87 | 71.71 | 0.93 | 1.93 | 0.10 | 0.018 | 2.449 | 0.0498 |
| Ex. 3.1B | 73.5 | 1.14 | | | | | 0.025 | 3.162 | 0.0702 |
| Ex. 3.1B | 72.5 | 1.11 | | | | | 0.016 | 2.935 | 0.0418 |
| Ex. 3.1B | 73.3 | 1.04 | | | | | 0.02 | 2.86 | 0.0544 |
| Ex. 3.2B | 74.5 | 1.07 | | | | | 0.012 | 3.138 | 0.0346 |
| Ex. 3.2B | 72.8 | 1.1 | | | | | 0.017 | 2.956 | 0.0457 |
| Ex. 3.2B | 72.4 | 1.07 | | | | | 0.016 | 2.797 | 0.0419 |
| Ex. 3.3B | 75.1 | 0.95 | | | | | 0.018 | 2.869 | 0.0537 |
| Ex. 3.3B | 76.3 | 1.04 | | | | | 0.017 | 3.356 | 0.055 |
| Ex. 3.3B | 75.2 | 1.03 | | | | | 0.017 | 3.133 | 0.0525 |
| Ex. 3.3B | 75.2 | 1.02 | | | | | 0.013 | 3.082 | 0.0394 |
| Ex. 3.3B | 75.2 | 1.04 | | | | | 0.018 | 3.149 | 0.054 |
| Ex. 3.3B | 74.5 | 1.04 | 74.21 | 1.05 | 1.27 | 0.049 | 0.016 | 3.04 | 0.0455 |
| Ex. 4.2B | 75.7 | 0.73 | | | | | 0.012 | 2.266 | 0.0377 |
| Ex. 4.2B | 73.6 | 0.87 | | | | | 0.012 | 2.426 | 0.0332 |
| Ex. 4.2B | 72.6 | 0.83 | | | | | n/a | 2.191 | n/a |
| Ex. 4.1B | 74.9 | 0.85 | | | | | 0.003 | 2.54 | 0.0095 |
| Ex. 4.1B | 75.9 | 0.86 | | | | | 0.011 | 2.716 | 0.0335 |
| Ex. 4.1B | 74.4 | 0.85 | 74.52 | 0.83 | 1.26 | 0.052 | 0.01 | 2.461 | 0.0286 |
| Ex. 5.2B | 74 | 0.86 | | | | | 0.009 | 2.439 | 0.0265 |
| Ex. 5.2B | 73.8 | 0.87 | | | | | 0.009 | 2.45 | 0.0256 |
| Ex. 5.2B | 76.2 | 0.87 | | | | | 0.008 | 2.793 | 0.0267 |
| Ex. S.1B | 75.8 | 0.85 | | | | | 0.012 | 2.66 | 0.0377 |
| Ex. 5.1B | 77.1 | 0.98 | | | | | 0.005 | 3.288 | 0.0179 |
| Ex. 5.1B | 75.9 | 0.84 | 75.47 | 0.88 | 1.30 | 0.051 | 0.011 | 2.661 | 0.0354 |
| Ex. 6.2B | 76.3 | 1.02 | | | | | 0.013 | 3.299 | 0.0418 |
| Ex. 6.2B | 77.2 | 1.05 | | | | | 0.014 | 3.56 | 0.0459 |
| Ex. 6.2B | 76.4 | 1. | | | | | 0.013 | 3.251 | 0.0431 |
| Ex. 6.1B | 76.5 | 1.05 | | | | | 0.008 | 3.426 | 0.0266 |
| Ex. 6.1B | 76.9 | 1.06 | | | | | 0.013 | 3.518 | 0.0431 |
| Ex. 6.1B | 76.8 | 1.04 | 76.68 | 1.04 | 0.343 | 0.0225 | 0.009 | 3.456 | 0.0284 |

A summary of the results of Table 2 is given in FIG. 1 which shows the specific coke as a function of weight % conversion to 220° C. minus products. Specific coke is a coke yield normalized to the second order conversion function: $x/(1-x)$ where x is the wt. % converted to 220° C. minus coke. As shown in FIG. 1, a mesoporous catalyst containing large particle gibbsite (Examples 1.3B–1.4B) has an average specific coke of 1.02 at a conversion of about 66.6 wt. %. Following rare earth exchange, the specific coke drops to 0.83 at a 74 wt. % conversion (Examples 4.1B–4.2B). This is in contrast to the pseudoboehmite containing catalyst (Examples 3.1B–3.3B) which has a specific coke of about 1.05 at a conversion of about 74.2 wt. %. Following rare earth exchange, these values show almost no change (1.04 at 76.7 wt. %, Examples 6.1B–6.2B). The small particle gibbsite containing catalyst (Examples 2.1B–2.3B) also shows improved specific coke and conversion upon rare earth exchange (Examples 5.1B–5.2B).

Figure 2:
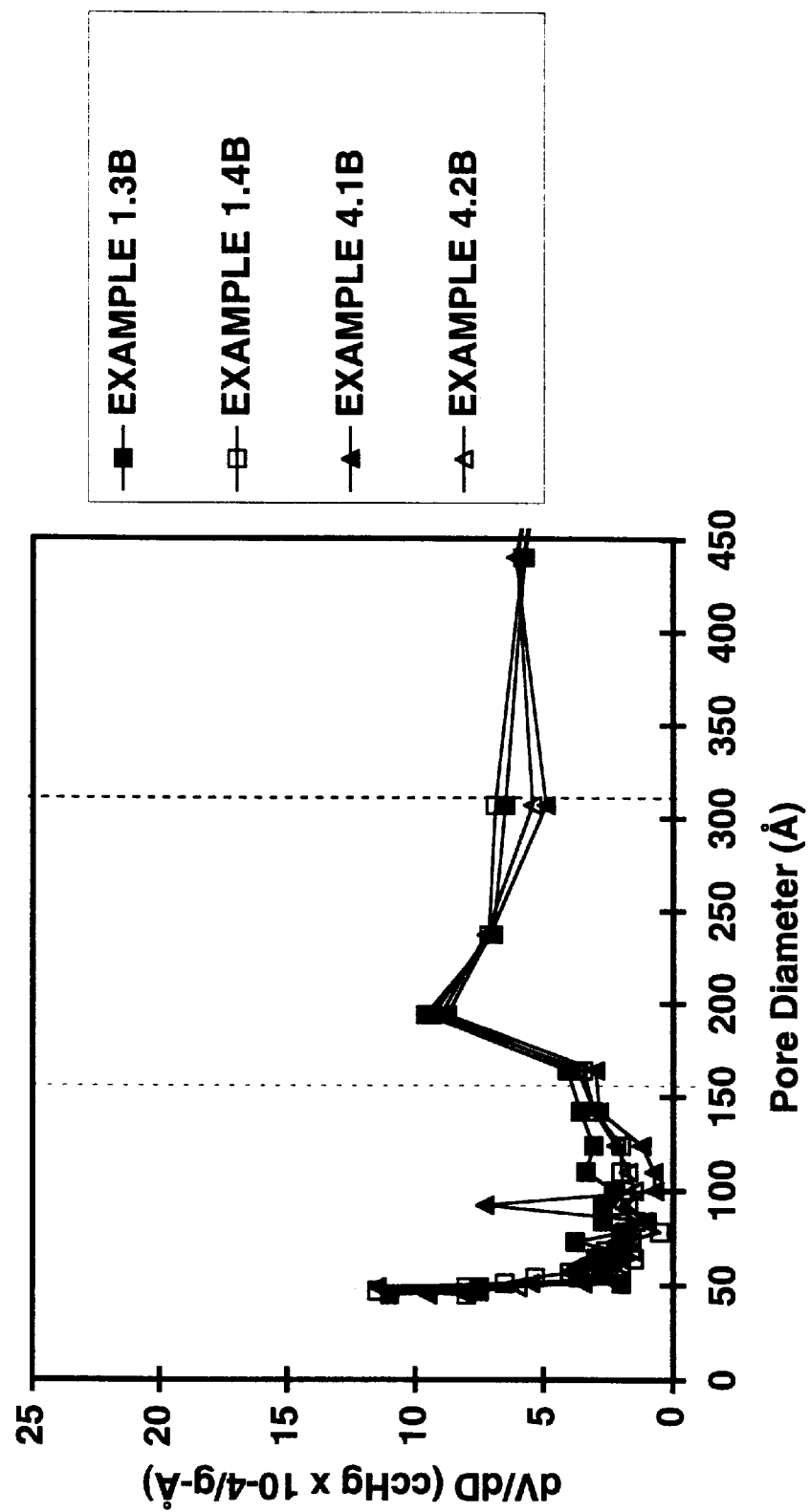
FIG. 2 shows the effect of exchange of rare earth into the calcined gibbsite-containing catalyst on pore size distribution for a large particle gibbsite after steaming.

FIG. 2 shows that the exchange of rare earth (lanthanum) into the gibbsite-containing catalyst does not lead to any significant changes in the catalyst pore size distribution between 160 and 320 Å when the gibbsite is a large particle gibbsite. FIG. 2 is a plot of pore size vs dV/dD where dV is the incremental intrusion volume of the mercury in a porosimeter in cc/g and dD is the change in pore diameter. D (the diameter of the pore) is given by $(4\gamma \cos\theta)/p$ where $\gamma$ is the surface tension of mercury, $\theta$ is the contact angle between mercury and the surface and is assumed to be 140° and p is the pressure.

Figure 3:
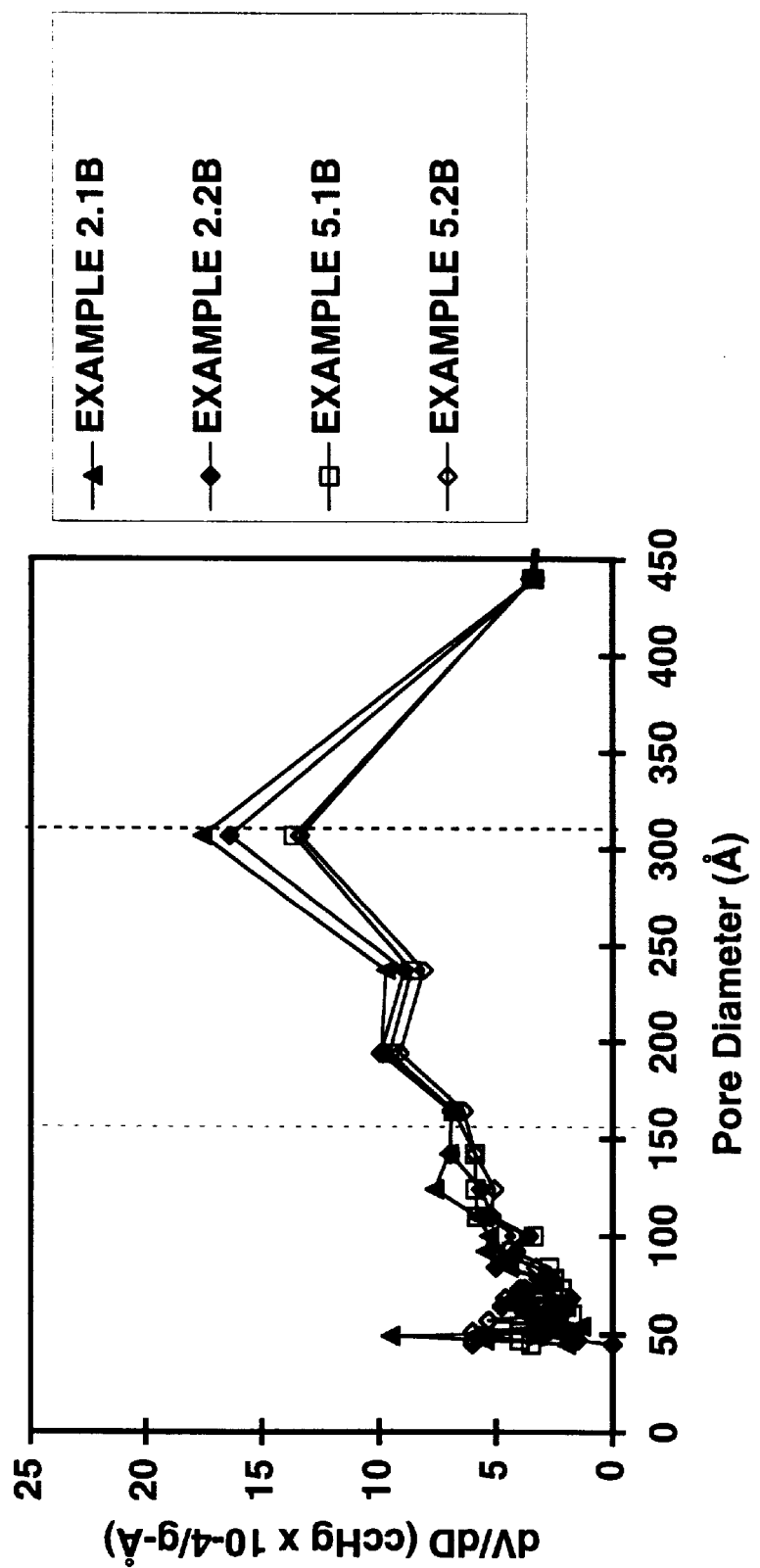
FIG. 3 shows the effect of exchange of rare earth into the calcined gibbsite-containing catalyst on pore size distribution for a small particle gibbsite after steaming.

FIG. 3 shows that the exchange of rare earth (lanthanum) into the gibbsite-containing catalyst does not lead to any significant changes in the catalyst pore size distribution between 160 and 320 Å when the gibbsite is a small particle gibbsite.

Figure 4:
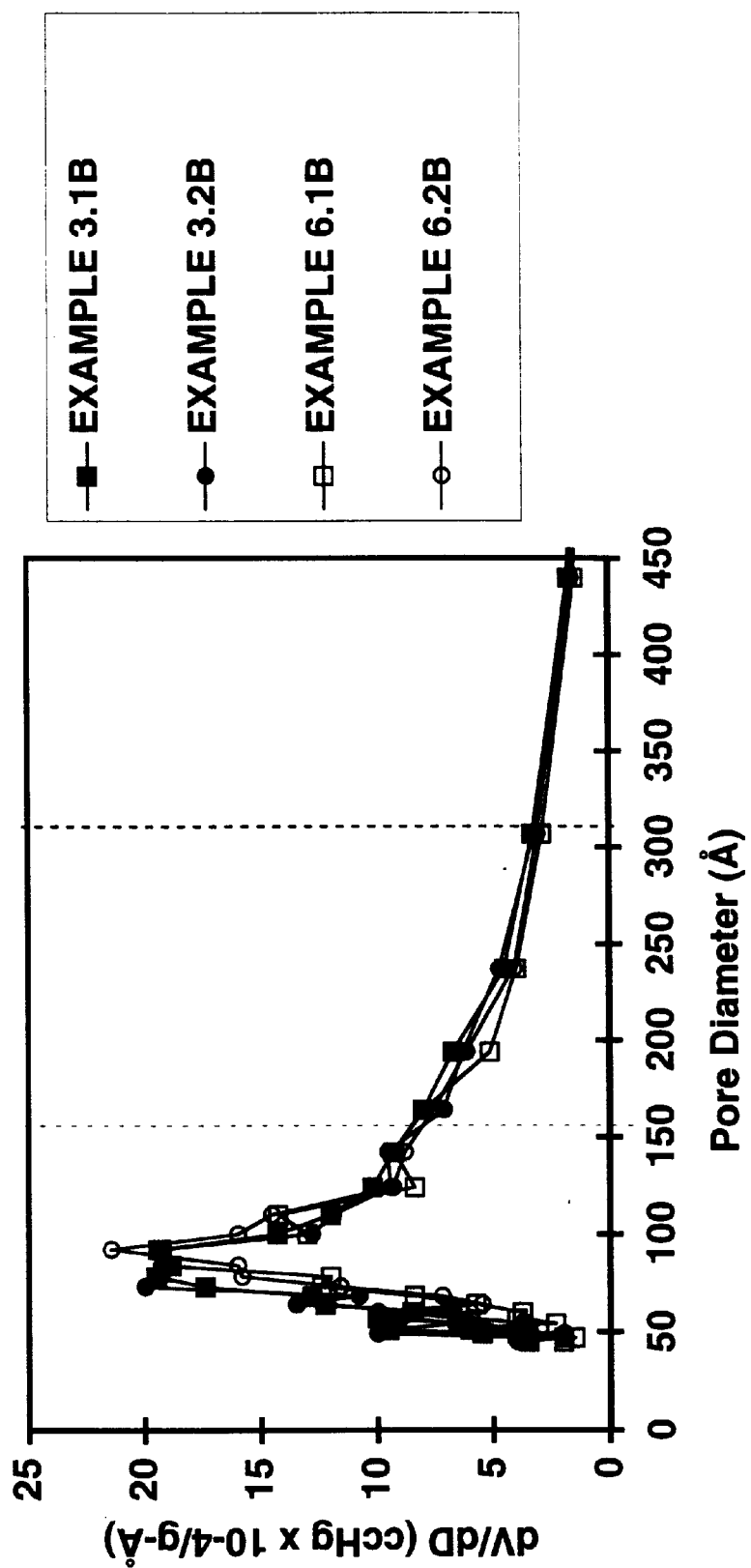
FIG. 4 is a graph showing the effect of exchange of rare earth into the calcined pseudo-boehmite-containing catalyst on pore size distribution after steaming.

FIG. 4 shows that the exchange of rare earth (lanthanum) into the gibbsite-containing catalyst does not lead to any significant changes in the catalyst pore size distribution with large particle pseudoboehmite.

In comparing FIGS. 2, 3 and 4, the catalysts according to the invention (FIG. 2 and 3) show a significant pore size distribution between 160 and 320 Å while a catalyst formulated with pseudoboehmite shows little pore size distribution over this same range. This pore size distribution is unexpected compared to other mesoporous catalytic cracking catalysts.

What is claimed is:

1. A catalytic cracking catalyst having improved selectivity for conversion over coke formation which comprises:
   (a) from 1 to 80 wt. %, based on catalyst composition, of a crystalline aluminosilicate zeolite having a silica to alumina mole ratio of about 1 or greater;
   (b) from 5 to 50 wt. %, based on catalyst composition, of an aluminum trihydroxide consisting essentially of gibbsite;
   (c) from 0.5 to 20 wt. %, based on catalyst composition, of at least one rare earth metal compound; and
   (d) a silica matrix, wherein the silica matrix is prepared from at least one of (i) a silica sol made by an ion-exchange process, and (ii) an acidic silica sol prepared by mixing sodium silicate, an acid, and an aluminum salt of a mineral acid provided that the sol is not converted to a gel during catalyst preparation.

2. A fluid catalytic cracking process for converting a hydrocarbon feedstock into lower boiling products which comprises contacting the feedstock with a fluidized bed of catalytic cracking catalyst having improved selectivity for conversion over coke formation under catalytic cracking conditions wherein the catalytic cracking catalyst comprises
   (a) from 1 to 80 wt. %, based on catalyst composition, of a crystalline aluminosilicate zeolite having a silica to alumina mole ratio of about 1 or greater;
   (b) from 5 to 50 wt. %, based on catalyst composition, of an aluminum trihydroxide consisting essentially of gibbsite;
   (c) from 0.5 to 20 wt. %, based on catalyst composition, of at least one rare earth metal compound; and
   (d) a silica matrix, wherein the silica matrix is prepared from at least one of (i) a silica sol made by an ion-exchange process, and (ii) an acidic silica sol prepared by mixing sodium silicate, an acid, and an aluminum salt of a mineral acid provided that the sol is not converted to a gel during catalyst preparation.

3. The catalyst of claim 1 wherein the silica matrix contains a clay.

4. The catalyst of claim 1 wherein the rare earth metal is lanthanum, neodymium, praeseodymium or cerium.

5. The catalyst of claim 1 wherein the silica matrix contains a pore distribution which is polymodal.

6. The catalyst of claim 5 wherein the polymodal pore distribution contains at least a first mode having at least about 75% pore sizes greater that 160 Angstroms in diameter and a second mode having up to about 20% of pore sizes greater than 100 but less that 160 Angstroms in diameter.

7. The catalyst of claim 1 wherein the amount of zeolite is from 5 to 20 wt. %, based on catalyst composition.

8. The catalyst of claim 1 wherein the amount of gibbsite is from 10 to 40 wt. %, based on catalyst composition.

9. The catalyst of claim 1 wherein the amount of rare earth metal compound is from 0.5 to 15 wt. %, based on catalyst composition.

10. The catalyst of claim 1 wherein the matrix material is mesoporous having pore diameters in the range between about 100 to 300 Angstroms.

11. The process of claim 2 wherein the silica matrix contains a clay.

12. The process of claim 2 wherein the rare earth metal is lathanum, neodymium, praeseodymium or cerium.

13. The process of claim 2 wherein the silica matrix contains a pore distribution which is polymodal.

14. The process of claim 13 wherein the polymodal pore distribution contains at least a first mode having at least about 75% pore sizes greater that 160 Angstroms in diameter and a second mode having at least about 20% of pore sizes greater than 100 but less that 160 Angstroms in diameter.

15. The process of claim 2 wherein the amount of zeolite is from 5 to 20 wt. %, based on catalyst composition.

16. The process of claim 2 wherein the amount of gibbsite is from 10 to 40 wt. %, based on catalyst composition.

17. The process of claim 2 wherein the amount of rare earth metal compound is from 0.5 to 15 wt. %, based on catalyst composition.

18. The process of claim 2 wherein the matrix material is mesoporous having pore diameters in the range between about 100 to 300 Angstroms.

* * * * *